(12) United States Patent
Kim et al.

(10) Patent No.: US 12,379,523 B2
(45) Date of Patent: Aug. 5, 2025

(54) POLARIZER, POLARIZING PLATE, AND OPTICAL DISPLAY DEVICE COMPRISING SAME

(71) Applicant: SAMSUNG SDI CO., LTD., Yongin-si (KR)

(72) Inventors: Do Won Kim, Suwon-si (KR); Han Saem Kang, Suwon-si (KR); Mun Bo Ko, Suwon-si (KR); Sung Man Cho, Suwon-si (KR); Ki Yong Kim, Suwon-si (KR); Eun Sol Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 436 days.

(21) Appl. No.: 17/798,829

(22) PCT Filed: Feb. 8, 2021

(86) PCT No.: PCT/KR2021/001647
§ 371 (c)(1),
(2) Date: Aug. 10, 2022

(87) PCT Pub. No.: WO2021/167282
PCT Pub. Date: Aug. 26, 2021

(65) Prior Publication Data
US 2023/0091995 A1    Mar. 23, 2023

(30) Foreign Application Priority Data
Feb. 17, 2020    (KR) .................. 10-2020-0019318

(51) Int. Cl.
*G02B 1/08*    (2006.01)
*G02B 1/04*    (2006.01)
(Continued)

(52) U.S. Cl.
CPC ................. *G02B 1/08* (2013.01); *G02B 1/04* (2013.01); *G02B 1/14* (2015.01); *G02B 1/18* (2015.01); *G02B 5/3033* (2013.01)

(58) Field of Classification Search
CPC ... G02B 1/04; G02B 1/08; G02B 1/14; G02B 1/18; G02B 5/30; G02B 5/3025; G02B 5/3033
See application file for complete search history.

(56) References Cited

U.S. PATENT DOCUMENTS

2007/0096367 A1    5/2007    Tsai et al.
2007/0132139 A1    6/2007    Aminaka et al.
(Continued)

FOREIGN PATENT DOCUMENTS

CN    1561456 A    1/2005
CN    101400725 A    4/2009
(Continued)

OTHER PUBLICATIONS

International Search Report of PCT/KR2021/001647, Jun. 1, 2021, 6 pages.
(Continued)

*Primary Examiner* — Stephone B Allen
*Assistant Examiner* — Adam W Booher
(74) *Attorney, Agent, or Firm* — Womble Bond Dickinson (US) LLP

(57) ABSTRACT

Provided are a polarizer comprising a polyvinyl alcohol-based film and having an endothermic peak of 50° C. to 60° C. when measured by differential scanning calorimetry at a temperature increase rate of 10° C./min; a polarizing plate comprising a polarizer and a first protective film and a second protective film laminated on one surface and the other surface of the polarizer, respectively, and having an initial shrinkage initiation temperature greater than 70° C.
(Continued)

and less than or equal to 90° C. during thermomechanical analysis; and an optical display device comprising same.

10 Claims, 1 Drawing Sheet

(51) Int. Cl.
*G02B 1/14* (2015.01)
*G02B 1/18* (2015.01)
*G02B 5/30* (2006.01)

(56) References Cited

U.S. PATENT DOCUMENTS

| | | |
|---|---|---|
| 2009/0012283 A1 | 1/2009 | Sasada |
| 2010/0081768 A1 | 4/2010 | Kizu et al. |
| 2016/0349538 A1 | 12/2016 | Ogaya et al. |
| 2018/0081101 A1 | 3/2018 | Kobori |
| 2019/0033495 A1 | 1/2019 | Kwak et al. |

FOREIGN PATENT DOCUMENTS

| | | |
|---|---|---|
| CN | 108700693 A | 10/2018 |
| CN | 110352212 A | 10/2019 |
| JP | 2003-96207 A | 4/2003 |
| JP | 2003-172823 A | 6/2003 |
| JP | 2003-248123 A | 9/2003 |
| JP | 2007-122050 A | 5/2007 |
| JP | 2008-102274 A | 5/2008 |
| JP | 2019-509517 A | 4/2019 |
| KR | 10-2006-0088245 A | 8/2006 |
| KR | 10-2013-0078606 A | 7/2013 |
| KR | 10-2015-0082874 A | 7/2015 |
| KR | 10-2018-0031601 A | 3/2018 |
| KR | 10-2018-0032175 A | 3/2018 |
| KR | 10-2019-0030522 A | 3/2019 |
| KR | 10-2019-0112123 A | 10/2019 |
| WO | WO 2008/068897 A1 | 6/2008 |
| WO | WO 2016/093259 A1 | 6/2016 |
| WO | WO 2017/195812 A1 | 11/2017 |
| WO | WO 2018/003671 A1 | 1/2018 |

OTHER PUBLICATIONS

Zhang Xuzhi, Wang et al., Ethylene Derivatives Engineering, Chemical Industry Press, pp. 641, 642 (Jul. 31, 1995) (Abstract in English).
Chinese Office Action dated Aug. 2, 2024, issued in corresponding Chinese Patent Application No. 202180014939.1 (9 pages).
Japanese Office Action dated Jan. 14, 2025, issued in corresponding Japanese Patent Application No. 2022-548456 (6 pages).
Chinese Office Action dated Jan. 30, 2024, issued in corresponding Chinese Patent Application No. 202180014939.1 (9 pages).
Japanese Office Action dated Jun. 17, 2025, issued in corresponding Japanese Patent Application No. 2022-548456 (8 pages).

【FIG. 1】
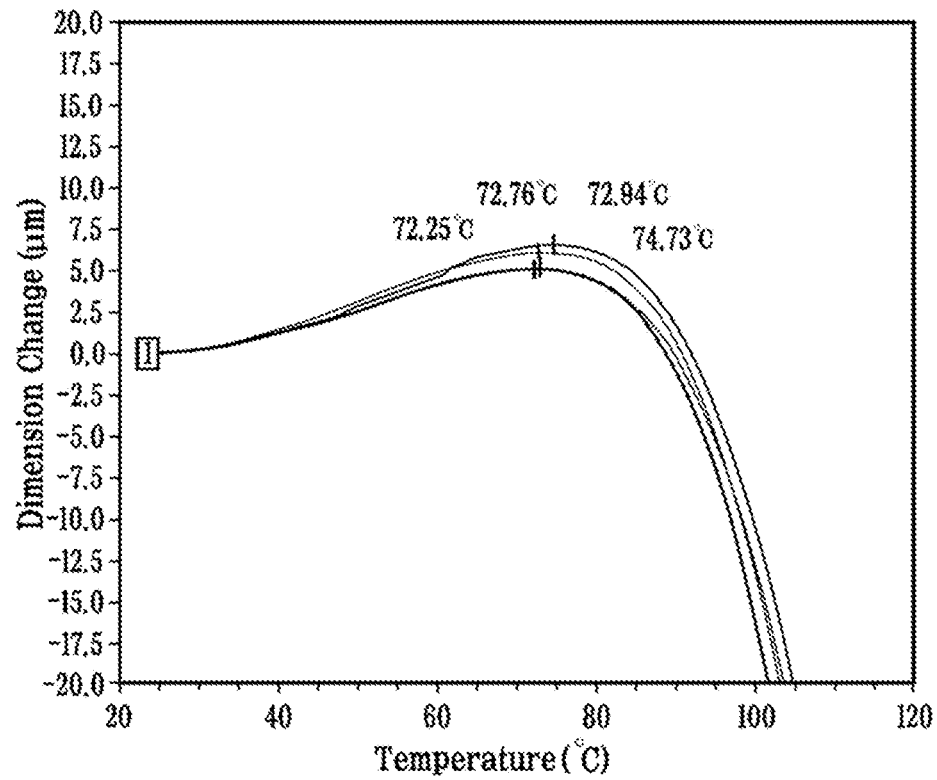
【FIG. 2】
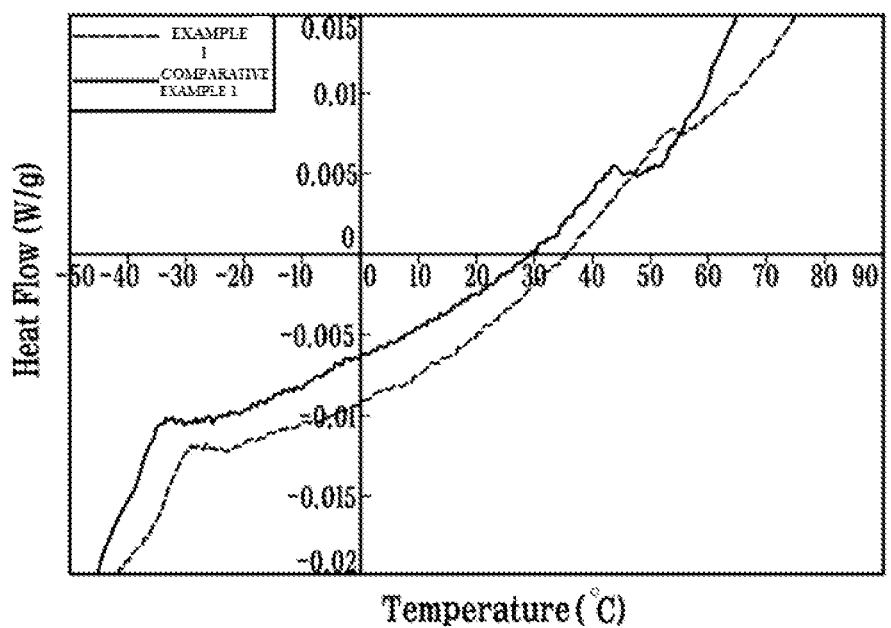

POLARIZER, POLARIZING PLATE, AND OPTICAL DISPLAY DEVICE COMPRISING SAME

CROSS-REFERENCE TO RELATED APPLICATIONS

This application is a U.S. National Phase Patent Application of International Application Number PCT/KR2021/001647, filed on Feb. 8, 2021, which claims priority to Korean Patent Application Number 10-2020-0019318, filed on Feb. 17, 2020, the entire content of each of which is incorporated herein by reference.

TECHNICAL FIELD

The present invention relates to a polarizer, a polarizing plate, and an optical display apparatus including the same. More particularly, the present invention relates to a polarizer and a polarizing plate, which can prevent generation of bubbles or observation of the bubbles through the naked eye when left at high temperature and/or under thermal impact after formation of a hole, can exhibit good reliability when left at high temperature and/or under thermal impact, and can suppress light leakage, and an optical display apparatus including the same.

BACKGROUND ART

A polarizing plate may include a polarizer and a protective layer stacked on at least one surface of the polarizer. The polarizing plate may be used in an optical display apparatus and may be inevitably exposed to high temperature and/or thermal impact for a long period of time. As a main property of the polarizing plate, polarization is realized by the polarizer of the polarizing plate. The polarizer is manufactured by uni-axially stretching a polyvinyl alcohol based film dyed with iodine. However, the polarizing plate can suffer from deterioration in reliability when left at high temperature and/or under thermal impact for a long period of time.

The polarizer may be manufactured by stretching a polyvinyl alcohol based film. In general, the polarizer is manufactured by dyeing and stretching the polyvinyl alcohol based film. Since a typical polyvinyl alcohol based film known in the art has a limit in terms of stretching ratio and stretching temperature, a polarizer produced therefrom has a limit in improvement in reliability when left at high temperature and/or under thermal impact. When stretched at a high stretching ratio and at high temperature, the polyvinyl alcohol based film can be fractured or melted in the course of stretching, thereby making it difficult to form the polarizer.

The polarizing plate may form a portion of a non-display region in which a camera is mounted in an optical display. In order to secure a light transmittance region for operation of the camera, a hole is formed on a portion of the polarizing plate, particularly a portion of the polarizer, by a chemical method or an optical method (laser irradiation and the like). The hole may be realized in the form of an opening formed through a portion of the polarizer or may be formed to have higher light transmittance than a portion of the polarizer not formed with the hole instead of being formed through the polarizer such as the opening. However, the polarizing plate can suffer from generation of bubbles around the hole even when left at high temperature and/or under thermal impact, whereby the bubbles can be observed through the naked eye or a non-polarized portion can be formed due to a difference in index of refraction caused by the bubbles, thereby causing display failure due to light leakage or poor image quality in a display region.

The background technique of the present invention is disclosed in Korean Patent Laid-open Publication No. 10-2013-0078606 and the like.

DISCLOSURE

Technical Problem

It is one aspect of the present invention to provide a polarizer and a polarizing plate, which can prevent generation of bubbles or observation of the bubbles through the naked eye when left at high temperature and/or under thermal impact after formation of a hole, can exhibit good reliability when left at high temperature and/or under thermal impact, and can suppress light leakage.

It is another aspect of the present invention to provide a polarizer and a polarizing plate prepared through a simple and economical method, which can prevent generation of bubbles or observation of the bubbles through the naked eye when left at high temperature and/or under thermal impact after formation of a hole, can exhibit good reliability when left at high temperature and/or under thermal impact, and can suppress light leakage.

Technical Solution

One aspect of the present invention relates to a polarizer.
1. The polarizer includes a polyvinyl alcohol based film and has an endothermic peak of 50° C. to 60° C., as measured at a temperature elevation rate of 10° C./min by differential scanning calorimetry.
2. In 1, the polyvinyl alcohol based film may contain both a hydrophilic functional group and a hydrophobic functional group.
3. In 1 and 2, the polyvinyl alcohol based film may have a softening point of about 65° C. to about 71° C.

Another aspect of the present invention relates to a polarizing plate.
4. The polarizing plate includes a polarizer and protective films respectively stacked on one surface and the other surface of the polarizer, and has an initial shrinkage onset temperature of greater than 70° C. and 90° C. or less, as measured at a temperature elevation rate of 10° C./min by thermomechanical analysis.
5. In 4, the polarizer may include a polyvinyl alcohol based film and may have an endothermic peak of 50° C. to 60° C., as measured at a temperature elevation rate of 10° C./min by differential scanning calorimetry.
6. In 4 and 5, the polyvinyl alcohol based film may contain both a hydrophilic functional group and a hydrophobic functional group.
7. In 4 to 6, the protective film may include a triacetyl-cellulose resin film, a polyethylene terephthalate resin film, or an amorphous cyclic polyolefin resin film.
8. In 4 to 7, the protective film may have an initial shrinkage onset temperature of 70° C. to 130° C., as measured at a temperature elevation rate of 10° C./min by thermomechanical analysis.

A further aspect of the present invention relates to an optical display apparatus.

The optical display apparatus includes the polarizer or the polarizing plate according to the present invention.

Advantageous Effects

The present invention provides a polarizer and a polarizing plate, which can prevent generation of bubbles or observation of the bubbles through the naked eye when left at high temperature and/or under thermal impact after formation of a hole, can exhibit good reliability when left at high temperature and/or under thermal impact, and can suppress light leakage.

The present invention provides a polarizer and a polarizing plate prepared from a simple and economical method, which can prevent generation of bubbles or observation of the bubbles through the naked eye when left at high temperature and/or under thermal impact after formation of a hole, can exhibit good reliability when at high temperature and/or under thermal impact, and can suppress light leakage.

DESCRIPTION OF DRAWINGS

FIG. 1 is a graph depicting an initial shrinkage onset temperature of a polarizing plate according to one embodiment of the present invention, as measured by thermomechanical analysis.

FIG. 2 is a graph depicting an endothermic peaks of polarizers of Example 1 (dotted line) and Comparative Example 1 (solid line), as measured by differential scanning calorimetry.

BEST MODE

Hereinafter, embodiments of the present invention will be described in detail with reference to the accompanying drawings to provide thorough understanding of the invention to those skilled in the art. It should be understood that the present invention may be embodied in various ways and is not limited to the following embodiments.

Herein, "endothermic peak" of a polarizer in measurement by differential scanning calorimetry (DSC) indicates an initial endothermic peak of the polarizer, as measured with respect to 5 mg to 10 mg of a polarizer sample in a heat flow manner; while increasing the temperature from −50° C. to 200° C.; at a temperature elevation rate of 10° C./min; under a nitrogen atmosphere. Referring to FIG. 2, a temperature at which heat flow is temporarily reduced in the course of rising together with increasing the temperature is defined as the endothermic peak.

Herein, "initial shrinkage onset temperature" of a polarizing plate in measurement by thermomechanical analysis (TMA) indicates an initial shrinkage onset temperature of the polarizing plate, as measured with respect to a polarizing plate sample having a size of 8 mm×5 mm (MD of polarizer×TD of polarizer) in a stretched direction (for example: MD of polarizer); while increasing the temperature from −50° C. to 200° C.; under a load of 0.02 N to 0.05 N; at a temperature elevation rate of 10° C./min; under a nitrogen atmosphere.

FIG. 1 shows initial shrinkage onset temperatures of various examples of a polarizing plate according to the present invention in thermomechanical analysis. Depending upon the temperature elevation rate, the size of a polarizing plate sample is maintained or increased with increasing temperature and starts to shrink at a certain temperature. Here, an inflection point corresponding to the temperature at which the sample starts to shrink is defined as an initial shrinkage onset temperature in measurement by thermomechanical (TMA) analysis. For measurement of the initial shrinkage onset temperature, the polarizing plate sample may have a thickness of 50 μm to 170 μm.

Herein, "initial shrinkage onset temperature" of a protective film in measurement by TMA analysis may be a value measured on a sample having a size of 8 mm×5 mm (MD of protective film×TD of protective film) in the same manner as in measurement of the initial shrinkage onset temperature of the polarizing plate.

As used herein to represent a specific numerical range, "X to Y" means a value greater than or equal to X and less than or equal to Y (X≤ and ≤Y).

Herein, the term "(meth)acryl" refers to acryl and/or methacryl.

The inventors completed the present invention based on the confirmation that a polarizer and a polarizing plate described below could prevent generation of bubbles or observation of the bubbles through the naked eye when left at high temperature and/or under thermal impact after formation of a hole, could exhibited good reliability when left at high temperature and/or under thermal impact while suppressing light leakage, and could be manufactured through a simple and economical method to improve processability and economic feasibility.

Herein, a polarizer according to one embodiment of the invention will be described.

The polarizer has an endothermic peak of 50° C. to 60° C., as measured at a temperature elevation rate of 10° C./min by differential scanning calorimetry. In differential scanning calorimetry, the endothermic peak means a phase transition temperature due to thermal history received by the polarizer in a stretching process when the polarizer is heated in measurement by differential scanning calorimetry. Within this range of endothermic peak, the polarizer formed with a hole can prevent generation of bubbles or observation of the bubbles around the hole through the naked eye when left at high temperature and/or under thermal impact. In addition, within this range of endothermic peak, the polarizer can remarkably prevent shrinkage at high temperature and/or under thermal impact, whereby the polarizer or a polarizing plate including the same can remarkably prevent variation in degree of polarization or light transmittance even when left at high temperature and/or under thermal impact while suppressing light leakage. For example, the polarizer may have an endothermic peak of 51° C. to 59° C.

The polarizer may have a thickness of about 5 μm to about 30 μm, specifically about 5 μm to about 15 μm. Within this range, the polarizer can be applied to a polarizing plate and can realize reduction in thickness of the polarizing plate.

The polarizer is manufactured from a polyvinyl alcohol based film through a process described below.

The polyvinyl alcohol based film contains a hydrophilic functional group and a hydrophobic functional group. The hydrophobic functional group is further present at the polyvinyl alcohol based film, in addition to the hydrophilic functional group including a hydroxyl group (OH group) present in the polyvinyl alcohol based film. The polyvinyl alcohol based film containing both the hydrophilic functional group and the hydrophobic functional group is manufactured by a process described below, thereby achieving the endothermic peak and the shrinkage onset temperature according to the present invention.

The hydrophobic functional group is present in at least one of a main chain and a side chain of the polyvinyl alcohol based resin forming the polyvinyl alcohol based film. Here, "main chain" refers to a portion forming a main backbone of the polyvinyl alcohol based resin and "side chain" refers to a backbone connected to the main chain. Preferably, the hydrophobic functional group is present in the main chain of the polyvinyl alcohol based resin.

The polyvinyl alcohol based resin containing both the hydrophilic functional group and the hydrophobic functional group may be prepared through polymerization of at least one vinyl ester monomer, such as vinyl acetate, vinyl formate, vinyl propionate, vinyl butyrate, vinyl pivalate, isopropenyl acetate, and the like, and a monomer providing the hydrophobic functional group. Preferably, the vinyl ester monomer may include vinyl acetate. The monomer providing the hydrophobic functional group may include a monomer providing a hydrocarbon repeat unit, including ethylene, propylene, and the like.

The polyvinyl alcohol based film may have a softening point of about 65° C. to about 71° C., for example, about 67° C. to about 69° C. Within this range, the polyvinyl alcohol based film does not suffer from melting and fracture upon stretching.

The polyvinyl alcohol based film may have a tensile strength of about 80 MPa to about 120 MPa, preferably about 90 MPa to about 110 MPa, as measured in a machine direction of the film. Within this range, the polyvinyl alcohol based film does not suffer from melting and fracture upon stretching, can provide a high degree of polarization through effective alignment of polyvinyl alcohol molecule chains, and can easily produce the polarizer according to the present invention. Tensile strength of the polyvinyl alcohol based film may be measured by a universal testing machine (UTM) at 25° C. in accordance with ASTM D882.

The polyvinyl alcohol based film may have a thickness of greater than about 0 μm and about 50 μm or less, for example, about 10 μm to about 50 Within this range, the polyvinyl alcohol based film does not suffer from melting and fracture upon stretching.

The polarizer is manufactured by sequentially subjecting the polyvinyl alcohol film to dyeing, stretching, and crosslinking processes.

The dyeing process includes treatment of the polyvinyl alcohol based film in a dichroic material-containing dyeing bath. In the dyeing process, the polyvinyl alcohol based film is dipped in the dichroic material-containing dyeing bath. The dichroic material-containing dyeing bath contains an aqueous solution containing a dichroic material and boric acid. In the dying bath containing the dichroic material together with a boron compound, the polyvinyl alcohol based film does not suffer from fracture even when dyed and stretched under the following conditions.

The dichroic material may include at least one iodine compound selected from among potassium iodide, hydrogen iodide, lithium iodide, sodium iodide, zinc iodide, aluminum iodide, lead iodide, and copper iodide. The dichroic material may be present in an amount of about 0.5 mol/ml to about 10 mol/ml, preferably about 0.5 mol/ml to about 5 mol/ml, in the dyeing bath, preferably in a dyeing solution. Within this range, the polyvinyl alcohol based film can be evenly dyed therewith.

The boron compound can assist in preventing the polyvinyl alcohol based film from being melted and broken upon stretching of the polyvinyl alcohol based film. The boron compound can assist in preventing the polyvinyl alcohol based film from being melted and broken film even upon stretching of the polyvinyl alcohol based film at a high temperature and at a high stretching ratio in the stretching process after the dyeing process.

The boron compound may include boric acid and/or borax. The boron compound may be present in an amount of about 0.1 wt % to about 5 wt %, preferably about 0.3 wt % to about 3 wt %, in the dyeing bath, preferably in the dyeing solution. Within this range, the polyvinyl alcohol based film does not suffer from melting and fracture upon stretching and can achieve high reliability.

Preferably, the dyeing solution has a temperature of about 20° C. to about 50° C., specifically about 25° C. to about 40° C. In the dyeing process, the polyvinyl alcohol film may be dipped in the dyeing bath for about 30 seconds to about 120 seconds, specifically about 40 seconds to about 80 seconds.

The stretching process includes stretching the dyed polyvinyl based alcohol film to about 5.7 times or more an initial length thereof, for example, about 5.7 times to about 7 times, preferably about 5.8 times to about 7 times, at a stretching temperature of about 58° C. or more, for example, at about 58° C. to about 65° C. A typical polyvinyl alcohol based film is melted and/or fractured upon stretching at the above stretching ratio and at the stretching temperature, and thus cannot form the polarizer.

The stretching process may be realized by wet stretching or dry stretching. Preferably, the stretching process includes wet stretching to allow use of the boron compound in the stretching process. Wet stretching includes mono-axially stretching the polyvinyl alcohol based film in the machine direction in an aqueous solution containing the boron compound.

The boron compound may include at least one of boric acid and borax, preferably boric acid. The boron compound may be present in an amount of about 0.5 wt % to about 10 wt %, preferably about 1 wt % to about 5 wt %, in a stretching bath, preferably in a stretching solution. Within this range, the polyvinyl alcohol based film does not suffer from melting and fracture upon stretching and can achieve high reliability.

The crosslinking process is performed to secure strong adsorption of the dichroic material to the polyvinyl alcohol based film subjected to the stretching process. A crosslinking solution used in the crosslinking process contains a boron compound. The boron compound can assist in improvement in reliability even when the polarizer is left at high temperature or under thermal shock while strengthening adsorption of the dichroic material described above.

The boron compound may include at least one of boric acid and borax. The boron compound may be present in an amount of about 0.5 wt % to about 10 wt %, preferably about 1 wt % to about 5 wt %, in a crosslinking bath, preferably in a crosslinking solution. Within this range, the polyvinyl alcohol film does not suffer from melting and fracture upon stretching and can achieve high reliability.

Before the dyeing process, the polyvinyl alcohol based film may further be subjected to at least one of a washing process and a swelling process.

In the washing process, the polyvinyl alcohol based film is washed with water to remove foreign matter from the polyvinyl alcohol based film.

In the swelling process, the polyvinyl alcohol based film is dipped in a swelling bath in a predetermined temperature range to facilitate dyeing and stretching of the dichroic material. The swelling process may include swelling the polyvinyl alcohol base film at about 15° C. to about 35° C., preferably about 20° C. to about 30° C., for about 30 seconds to about 50 seconds.

After the crosslinking process, the polyvinyl alcohol based film may be further subjected to a color correction process. The color correction process can improve durability of the polyvinyl alcohol based film. A color correction bath may optionally contain about 10 wt % or less, preferably about 1 wt % to about 5 wt %, of potassium iodide.

In one embodiment, a portion of the polarizer may be formed with a hole, which forms a non-polarization region. The hole may constitute a region in which a camera is disposed upon application of the polarizer to an optical display device. The hole may be formed by any method without limitation. By way of example, the hole may be formed by a chemical process or an optical process, such as laser irradiation and the like. The hole may be realized in the form of an opening penetrated through a portion of the polarizer or may be formed to have higher light transmittance than a portion of the polarizer not formed with the hole, instead of being formed through the polarizer.

After formation of the hole, the polarizer may have bubbles formed at an interface of the hole when left at high temperature and/or under thermal impact and having a maximum size (diameter) of about 100 µm or less, for example, about 0 µm to about 100 µm. When the bubbles formed around the hole have a size of about 100 µm or less, the bubbles can be covered by a black matrix around the hole in a display so as not to be recognized by a user through the naked eye. In addition, even when several bubbles are connected to each other around the hole, the bubbles cannot be recognized for the same reason, if the maximum size of the bubbles from the center of the hole to the outside is about 100 µm or less.

Next, a polarizing plate according to one embodiment of the present invention will be described.

The polarizing plate include includes a polarizer and first and second protective films respectively stacked on opposite surfaces of the polarizer, and has an initial shrinkage onset temperature of greater than 70° C. and 90° C. or less, as measured at a temperature elevation rate of 10° C./min by thermomechanical analysis. Within this range, the polarizing plate can exhibit good reliability when left at high temperature or under thermal impact. Further, within this range, the polarizing plate can prevent generation of bubbles or observation of the bubbles when left at high temperature and/or under thermal impact after formation of the hole. For example, the polarizing plate may have an initial shrinkage onset temperature of greater than 70° C. and 90° C. or less, specifically greater than 70° C. and 80° C. or less.

In one embodiment, the polarizing plate may have a polarization variation ΔP1 of about 3% or less, for example, about 0% to about 3%, as calculated by Equation 1, and may have a polarization variation of about 3% or less, for example, about 0% to about 3%, as calculated by Equation 2. Within this range, the polarizing plate has a low polarization variation when left at high temperature or under thermal impact, thereby securing good properties in terms of reliability, processability and economic feasibility.

$$\Delta P1 = |P1 - P0| \quad \text{[Equation 1]}$$

where P0 is an initial degree of polarization of the polarizing plate (unit: %), and P1 is the degree of polarization of the polarizing plate after being left at 95° C. for 500 hours (unit: %).

$$\Delta P2 = |P2 - P0| \quad \text{[Equation 2]}$$

where P0 is an initial degree of polarization of the polarizing plate (unit: %), and P2 is the degree of polarization of the polarizing plate after 100 cycles each referring to a process in which the polarizing plate is left at −40° C. for 30 min and left at 80° C. for 30 min (unit: %).

Polarizer

The polarizer includes the polarizer according to the embodiment of the invention.

First Protective Film

The first protective film may be stacked on one surface of the polarizer to protect the polarizer while improving mechanical strength of the polarizing plate. The first protective film may include an optically transparent protective film.

The protective film may be formed through melting and extrusion of an optically transparent resin. The protective film may be further subjected to a stretching process, as needed. The resin may include at least one selected from among cellulose ester based resins including triacetylcellulose and the like, cyclic polyolefin based resins including an amorphous cyclic olefin polymer (COP) and the like, polycarbonate based resins, polyester based resins including polyethylene terephthalate (PET) and the like, polyether sulfone based resins, polysulfone based resins, polyamide based resins, polyimide based resins, non-cyclic polyolefin based resins, polyacrylate based resins including poly(methyl methacrylate) and the like, polyvinyl alcohol based resins, polyvinyl chloride based resins, and polyvinylidene chloride based resins.

In one embodiment, the first protective film may have an initial shrinkage onset temperature of 70° C. to 130° C., preferably 75° C. to 125° C., 80° C. to 120° C., 80° C. to 115° C., or 85° C. to 100° C., as measured at a temperature elevation rate of 10° C./min by thermomechanical analysis. Within this range, the first protective film can improve reliability of the polarizing plate together with the polarizer when left at high temperature and under thermal impact while suppressing generation of bubbles around the hole.

The first protective film may have a thickness of about 5 µm to about 200 µm, specifically about 20 µm to about 40 µm. Within this range, the first protective film can be used in the polarizing plate.

The polarizing plate may further include functional coating layers, such as a hard coating layer, a fingerprint-proof layer, an anti-reflection layer, and the like, on an upper surface of the first protective film.

Second Protective Film

The second protective film may be stacked on the other surface of the polarizer to protect the polarizer while improving mechanical strength of the polarizing plate. The second protective film may be formed of the same resin as or a different resin than the first protective film.

In one embodiment, when the first protective film is a cellulose ester based resin film including triacetylcellulose and the like, the second protective film may be a cellulose ester based resin film including triacetylcellulose and the like.

In another embodiment, when the first protective film is a polyester based resin film including polyethylene terephthalate (PET) and the like, the second protective film may be a cyclic polyolefin based resin film including an amorphous cyclic olefin polymer (COP) and the like or a cellulose ester based resin film including triacetylcellulose and the like.

The second protective film may have the same thickness as or a different thickness than the first protective film.

In one embodiment, the second protective film may have an initial shrinkage onset temperature of 70° C. to 130° C., preferably 75° C. to 125° C., 80° C. to 120° C., 80° C. to 115° C., or 85° C. to 100° C., as measured at a temperature elevation rate of 10° C./min by thermomechanical analysis. Within this range, the second protective film can improve reliability of the polarizing plate together with the polarizer when left at high temperature and under thermal impact while suppressing generation of bubbles around the hole.

In the polarizing plate, the first protective film may be bonded to the second protective film via a bonding layer. The bonding layer may be formed of a bonding agent for typical polarizing plates, which is well-known to those skilled in the art. For example, the bonding layer may be formed of a water-based bonding agent or a photocurable bonding agent. Preferably, the bonding layer is formed of a photocurable bonding agent to improve processability by increasing the chemical crosslinking rate of organic acid anions in zinc organic acid salts without additional UV treatment for chemical crosslinking of the organic acid anions.

The photocurable bonding agent may include an initiator and at least one selected from among an epoxy compound and a (meth)acrylic compound. The initiator may include a photo radical initiator and/or a photo cationic initiator. The photocurable bonding agent may further include typical additives, such as an antioxidant, a pigment, and the like. The bonding layer may have a thickness of about 0.1 μm to about 10 μm. Within this range, the bonding layer can be used in an optical display device.

The polarizing plate may further include an adhesive layer on a lower surface thereof to achieve adhesion of the polarizing plate to a liquid crystal panel. The adhesive layer may be formed of a pressure-sensitive adhesive, without being limited thereto.

Next, an optical display device according to one embodiment of the present invention will be described.

The optical display device according to the present invention may include the polarizer or the polarizing plate according to the present invention. The optical display device may include a liquid crystal display and/or a light emitting display. The light emitting display may include an organic or organic-inorganic light emitting device as a light emitting device, which may include a light emitting diode (LED), an organic light emitting diode (OLED), a quantum dot light emitting diode (QLED), or a device containing a light emitting substance, such as phosphors and the like.

MODE FOR INVENTION

Next, the present invention will be described in more detail with reference to some examples. However, it should be noted that these examples are provided for illustration only and are not to be construed in any way as limiting the present invention.

Example 1

(1) Fabrication of Polarizer

A polyvinyl alcohol film (TS-#3000, Kuraray Co., Ltd., Japan, film having hydrophobic functional groups-containing main chain, thickness: 30 tensile strength (at 25° C.): 98 MPa) washed with water at 25° C. was subjected to a swelling process in a water swelling bath at 30° C.

Thereafter, the polyvinyl alcohol film was left in a dyeing bath filled with an aqueous solution containing 1 mol/ml of potassium iodide and 1 wt % of boric acid at 30° C. for 65 seconds. Next, the polyvinyl alcohol film was stretched to 5.9 times an initial length thereof in a wet stretching bath filled with an aqueous solution containing 3 wt % of boric acid at 60° C. Next, the polyvinyl alcohol film was passed through a crosslinking bath filled with an aqueous solution containing 3 wt % of boric acid at 25° C. for 65 seconds.

Next, the polyvinyl alcohol film was dipped in a color correction bath filled with an aqueous solution containing 4.5 wt % of potassium iodide at 30° C. for 10 seconds. Thereafter, the film was washed and dried, thereby fabricating a polarizer (thickness: 12 μm).

(2) Fabrication of Polarizing Plate

With a water-based bonding agent applied to both surfaces of the fabricated polarizer, a triacetylcellulose (TAC) film (thickness: 30 FujiTAC, Fuiji Co., Ltd.) was bonded to one surface of the polarizer and a TAC film (thickness: 20 FujiTAC, shrinkage onset temperature: 90° C., Fuiji Co., Ltd.) was bonded to the other surface of the polarizer, thereby fabricating a polarizing plate.

Examples 2 to 5

Polarizers and polarizing plates were fabricated in the same manner as in Example 1 except that the content of each component in the dyeing bath, the stretching bath and the crosslinking bath were changed together with the stretching temperature, the stretching rate, and the kind of protective film, as listed in Table 1.

Comparative Example 1

A polyvinyl alcohol film (PE-#3000, Kuraray Co., Ltd., Japan, film not having hydrophobic functional groups-containing main chain, thickness: 30 μm) washed with water at 25° C. was subjected to a swelling process in a water swelling bath at 30° C.

Thereafter, the polyvinyl alcohol film was left in a dyeing bath filled with an aqueous solution containing 1 mol/ml of potassium iodide and 1 wt % of boric acid at 30° C. for 65 seconds. Next, the polyvinyl alcohol film was stretched to 5.7 times an initial length thereof in a wet stretching bath filled with an aqueous solution containing 3 wt % of boric acid at 53° C. Next, the polyvinyl alcohol film was passed through a crosslinking bath filled with an aqueous solution containing 3 wt % of boric acid at 25° C. for 65 seconds.

Next, the polyvinyl alcohol film was dipped in a color correction bath filled with an aqueous solution containing 4.5 wt % of potassium iodide at 30° C. for 10 seconds. Thereafter, the film was washed and dried, thereby preparing a polarizer (thickness: 12 μm).

A polarizing plate was fabricated using the fabricated polarizer in the same manner as in Example 1.

Comparative Example 2

A polarizing plate was fabricated in the same manner as in Example 1 using a polyvinyl alcohol film (PE-#3000, Kuraray Co., Ltd., Japan, film not having hydrophobic functional groups-containing main chain, thickness: 30 μm).

The polarizers and the polarizing plates fabricated in Examples and Comparative Examples were evaluated as to the following properties and results are shown in Table 1 and FIG. 2.

(1) Endothermic peak (unit: ° C.): 5 mg to 10 mg of a polarizer sample was prepared, followed by measuring an initial endothermic peak in a heat flow manner; while increasing the temperature from −50° C. to 200° C.; at a temperature elevation rate of 10° C./min; under a nitrogen atmosphere; using a differential scanning calorimeter (Discovery, TA Instruments).

(2) Initial shrinkage onset temperature (unit: ° C.): A polarizing plate was cut into a specimen having a size of 8 mm×5 mm (MD of polarizer×TD of polarizer), followed by measurement of an initial shrinkage onset temperature through treatment in the stretched direction of the polarizer while increasing the temperature from −50° C. to 200° C.; at a temperature elevation rate of 10° C./min; under a load of 0.02 N; under a nitrogen atmosphere; in a thermomechanical analyzer (Q400 TMA, TA Instruments).

(3) Generation of hole bubble: A sample was fabricated by stacking a glass substrate (0.5T), a hole (circle having a radius of 5 mm)-formed polarizer of each of Examples and Comparative Examples, OCA (Optically Clear Adhesive, OCA-8371, 3M), and glass (0.5T), followed by UV curing with UVA at 2 J/cm². The sample was subjected to 100 cycles each referring to a process in which the sample was left at −40° C. for 30 min and left at 80° C. for 30 min (under the same condition in application of thermal impact in (4)) to check generation of bubbles around the hole. A polarizing plate having bubbles formed around the hole and having a maximum diameter of 100 μm or less was rated as "X" and a polarizing plate having bubbles formed around the hole and having a maximum diameter of greater than 100 μm was rated as "○". If the bubbles formed around the hole have a maximum diameter of 100 μm or less, the bubbles can be covered by a black matrix around a hole in a display so as not to be recognized by a user through the naked eye. However, if several bubbles are connected to each other around the hole to have a maximum size of 100 μm or less, as measured from the center of the hole to the outside, the bubbles cannot be recognized by a user for the same reason. Thus, the corresponding polarizing plate was rated as "X".

(4) Polarization variation (unit: %): The polarizing plate was cut into a specimen having a size of 3 cm×7 cm (MD of polarizer×TD of polarizer), followed by measurement of the degree of polarization at a wavelength of 380 nm to 780 nm using a V-7100 (JASCO) before and after the polarizing plate was left at 95° C. for 500 hours. Polarization variation was calculated according to Equation 1.

With regard to variation in the degree of polarization under thermal impact, the degree of polarization was measured at a wavelength of 380 nm to 780 nm using a V-7100 (JASCO) before or after repetition of 100 cycles each referring to a process in which the polarizing plate was left at −40° C. for 30 min and left at 80° C. for 30 min. Thereafter, the polarization variation was calculated according to Equation 2.

invention exhibited good suppression of light leakage when applied to an optical display device. Further, although not shown in Table 1, the polarizing plates according to the present invention had an initial shrinkage onset temperature of greater than 70° C. and 90° C. or less, as measured by thermomechanical analysis, thereby suppressing generation of the bubbles around the hole.

On the contrary, as shown in Table 1 and FIG. 2, the polarizer of Comparative Example 1 fabricated using a typical hydrophobic functional group-free polyvinyl alcohol film had an endothermic peak of less than 50° C., as measured by differential scanning calorimetry, and the polarizing plate of Comparative Example 1 had an initial shrinkage onset temperature of 70° C. or less, as measured at a temperature elevation rate of 10° C./min by thermomechanical analysis, thereby exhibiting poor reliability at high temperature and under thermal impact while allowing severe generation of bubbles around the hole.

The polarizer of Comparative Example 2 could not be fabricated due to melting and fracture of the hydrophobic functional group-free polyvinyl alcohol film upon stretching.

It should be understood that various modifications, changes, alterations, and equivalent embodiments can be made by those skilled in the art without departing from the spirit and scope of the present invention.

The invention claimed is:

1. A polarizer, comprising a polyvinyl alcohol based film, and having an endothermic peak of 50° C. to 60° C., as measured at a temperature elevation rate of 10° C./min by differential scanning calorimetry.

2. The polarizer according to claim 1, wherein the polyvinyl alcohol based film contains both a hydrophilic functional group and a hydrophobic functional group.

TABLE 1

|  |  | Example | | | | | Comparative Example | |
| --- | --- | --- | --- | --- | --- | --- | --- | --- |
|  |  | 1 | 2 | 3 | 4 | 5 | 1 | 2 |
| PVA film |  | TS-#3000 | TS-#3000 | TS-#3000 | TS-#3000 | TS-#3000 | PE-#3000 | PE-#3000 |
| Stretching temperature (° C.) |  | 60 | 60 | 58 | 60 | 60 | 53 | 60 |
| Stretching ratio |  | 5.9 | 5.8 | 5.9 | 5.9 | 5.9 | 5.7 | 5.9 |
| First protective film |  | TAC | TAC | TAC | COP** | TAC | TAC | TAC |
| Second protective film |  | TAC | TAC | TAC | TAC | COP** | TAC | TAC |
| Endothermic peak |  | 54 | 53 | 52 | 56 | 55 | 42 | —* |
| Initial shrinkage onset temperature |  | 73 | 71 | 72 | 75 | 74 | 67 | —* |
| Generation of hole bubbles |  | X | X | X | X | X | ○ | —* |
| Polarization variation | Equation 1 | 0.10 | 0.15 | 0.12 | 0.08 | 0.07 | 0.21 | —* |
|  | Equation 2 | 0.51 | 0.48 | 0.62 | 0.35 | 0.41 | 1.2 | —* |

In *Comparative Example 2 of Table 1, the polarizer could not be fabricated due to melting and fracture of the polyvinyl alcohol film upon stretching.
**COP: ZEON, ZB12-052125

As shown in Table 1 and FIG. 2, the polarizers according to the present invention had an endothermic peak of 50° C. to 60° C., as measured by differential scanning calorimetry, and the polarizing plates according to the present invention had an initial shrinkage onset temperature of greater than 70° C. and 90° C. or less, as measured at a temperature elevation rate of 10° C./min by thermomechanical analysis, thereby suppressing generation of bubbles while securing reliability when left at high temperature and under thermal impact. In addition, although not shown in Table 1, the polarizer and polarizing plate according to the present 3. The polarizer according to claim 1, wherein the polyvinyl alcohol based film has a softening point of about 65° C. to about 71° C.

4. An optical display device comprising the polarizer according to claim 1.

5. A polarizing plate comprising a polarizer and protective films respectively stacked on opposite surfaces of the polarizer, the polarizing plate having an initial shrinkage onset temperature of greater than 70° C. and 90° C. or less, as measured at a temperature elevation rate of 10° C./min by thermomechanical analysis.

6. The polarizing plate according to claim 5, wherein the polarizer comprises a polyvinyl alcohol based film and has an endothermic peak of 50° C. to 60° C., as measured at a temperature elevation rate of 10° C./min by differential scanning calorimetry.

7. The polarizing plate according to claim 5, wherein the polyvinyl alcohol based film has both a hydrophilic functional group and a hydrophobic functional group.

8. The polarizing plate according to claim 5, wherein the protective film comprises a triacetylcellulose resin film, a polyethylene terephthalate resin film, or an amorphous cyclic polyolefin resin film.

9. The polarizing plate according to claim 5, wherein the protective film has an initial shrinkage onset temperature of 70° C. to 130° C., as measured at a temperature elevation rate of 10° C./min by thermomechanical analysis.

10. An optical display device comprising the polarizing plate according to claim 5.

* * * * *